May 3, 1932. E. R. STANDFUSS 1,856,441
SELF DUMPING CRAWLER WAGON
Filed May 9, 1930 3 Sheets-Sheet 1
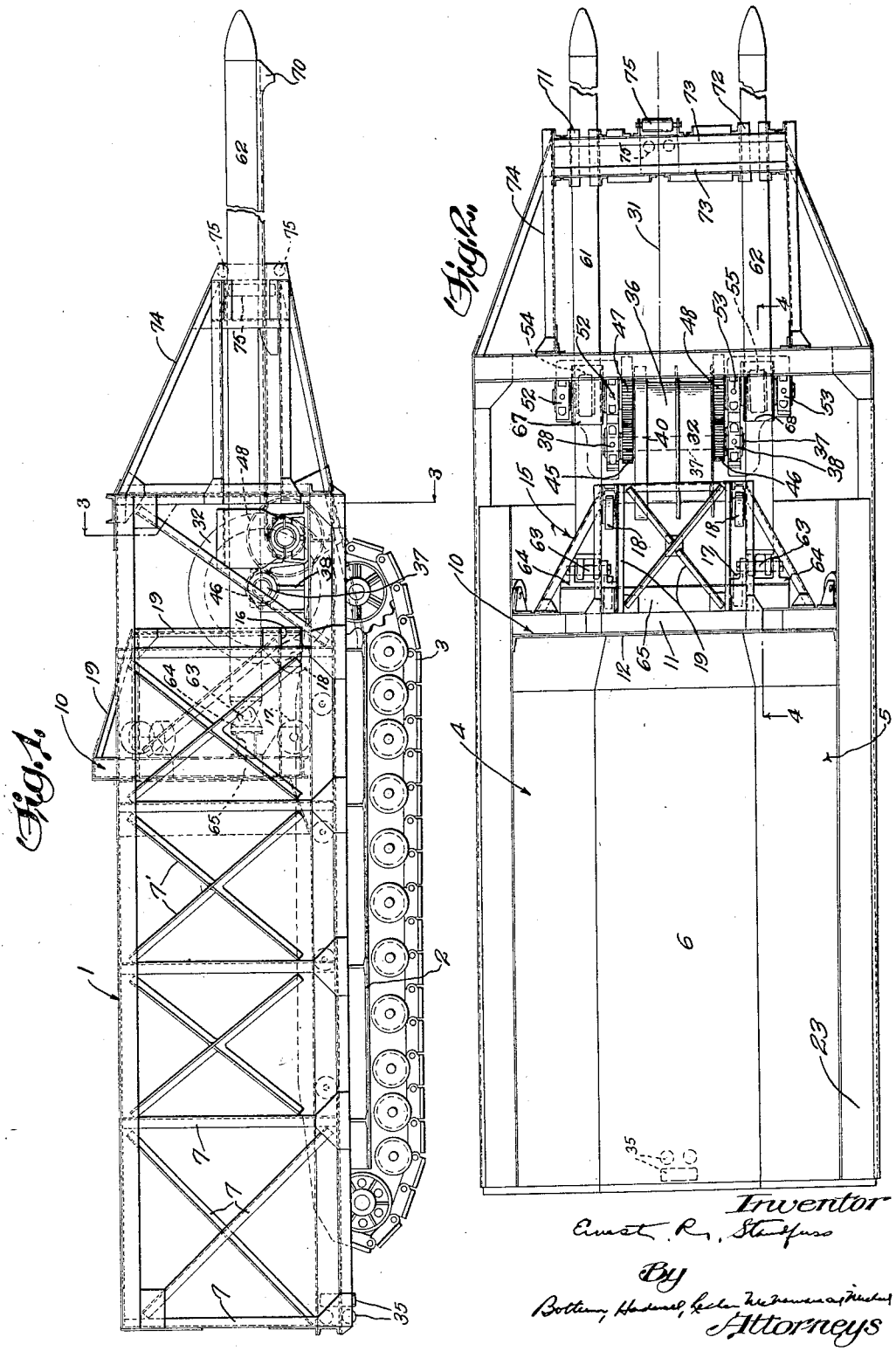
Inventor
Ernest R. Standfuss
By
Bottum, Hadsell, Geder
Attorneys

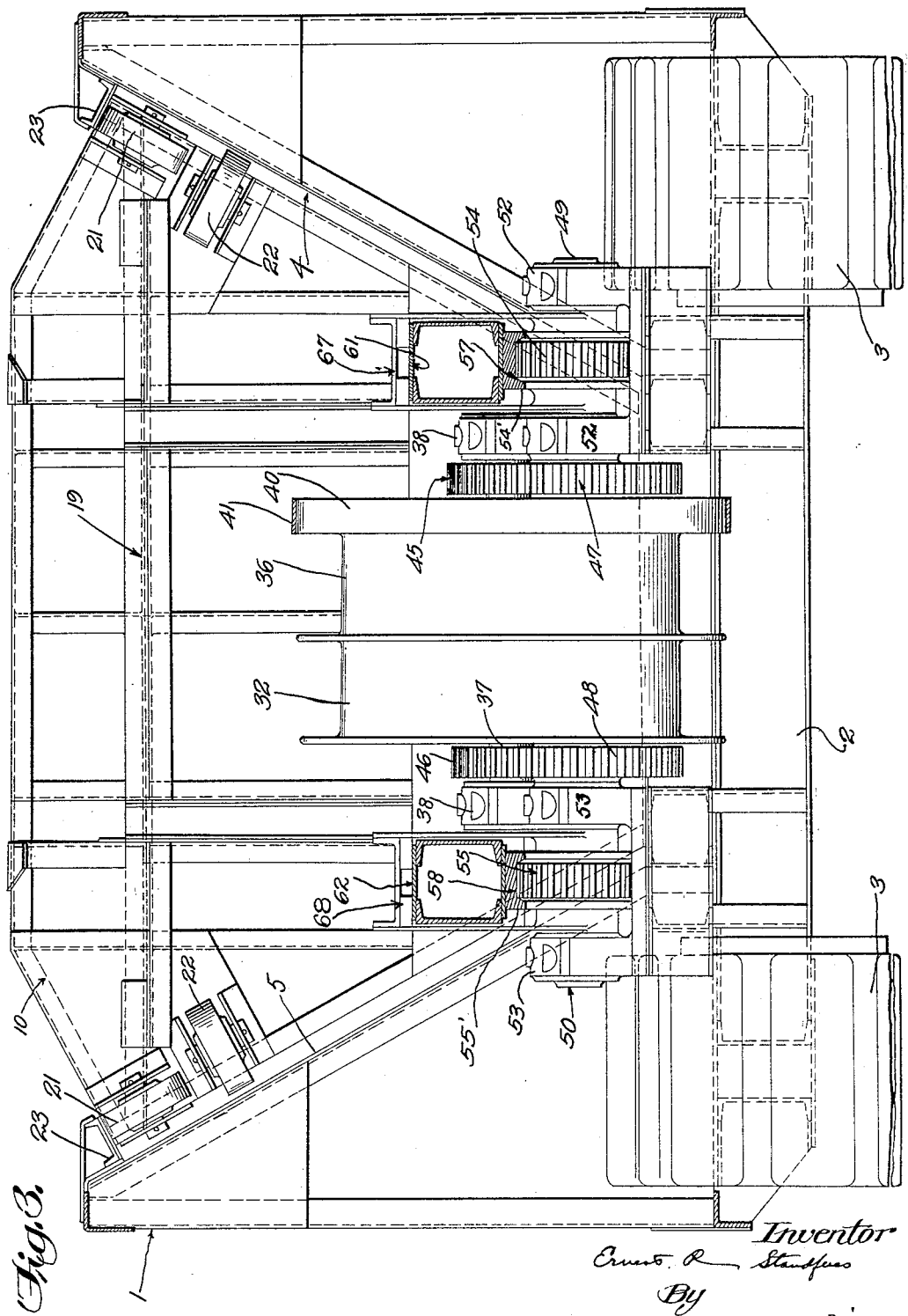

May 3, 1932.  E. R. STANDFUSS  1,856,441
SELF DUMPING CRAWLER WAGON
Filed May 9, 1930  3 Sheets-Sheet 3

Inventor
Ernest R. Standfuss
By
Attorneys

Patented May 3, 1932　　　　　　　　　　　　　　　　1,856,441

UNITED STATES PATENT OFFICE

ERNEST R. STANDFUSS, OF MILWAUKEE, WISCONSIN, ASSIGNOR TO HARNISCHFEGER CORPORATION, OF MILWAUKEE, WISCONSIN, A CORPORATION OF WISCONSIN

SELF-DUMPING CRAWLER WAGON

Application filed May 9, 1930.　Serial No. 450,911.

This invention relates to an improvement in self-dumping crawler wagons of the type shown in the pending application of Gwynn L. Lillard for excavating systems, filed October 11, 1929, Serial No. 398,837.

In common with the crawler wagon or movable carrier of the application above referred to, the movable carrier of the present invention has its body mounted on a frame carried by free running endless treads or self-laying tracks. The body of the wagon is made up of sides and a movable or sliding end gate. Only one end gate is provided so that at one end the body of the wagon is open. The wagon is pulled back and forth by haul-in and haul-back lines which may also be utilized, when desired, to operate the sliding gate.

One of the principal objects of the present invention is to provide a crawler wagon of this general character which embodies a novel organization between the haul-back and haul-in lines and the sliding gate so that when it is desirable to cause these lines to operate or move the sliding gate for discharging the contents from the wagon, the heavy operating force required to move the gate against the resistance presented by the contents of the wagon will be developed and effectively applied to the sliding gate.

Another object is to provide a gate and body construction and a mounting between the body and the gate which constrains it to proper movement and yet reduces to a minimum the friction between the gate and the wagon body.

Another object of the present invention is to provide a crawler wagon having these advantages and capacities and which is of simple and durable construction, reliable and effective in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view in side elevation showing a crawler wagon embodying the present invention;

Figure 2 is a view in top plan of the wagon shown in Figure 1;

Figure 3 is a view in vertical section taken on line 3—3 of Figure 1, parts being shown in elevation for the sake of simplicity in illustration.

Figure 4:
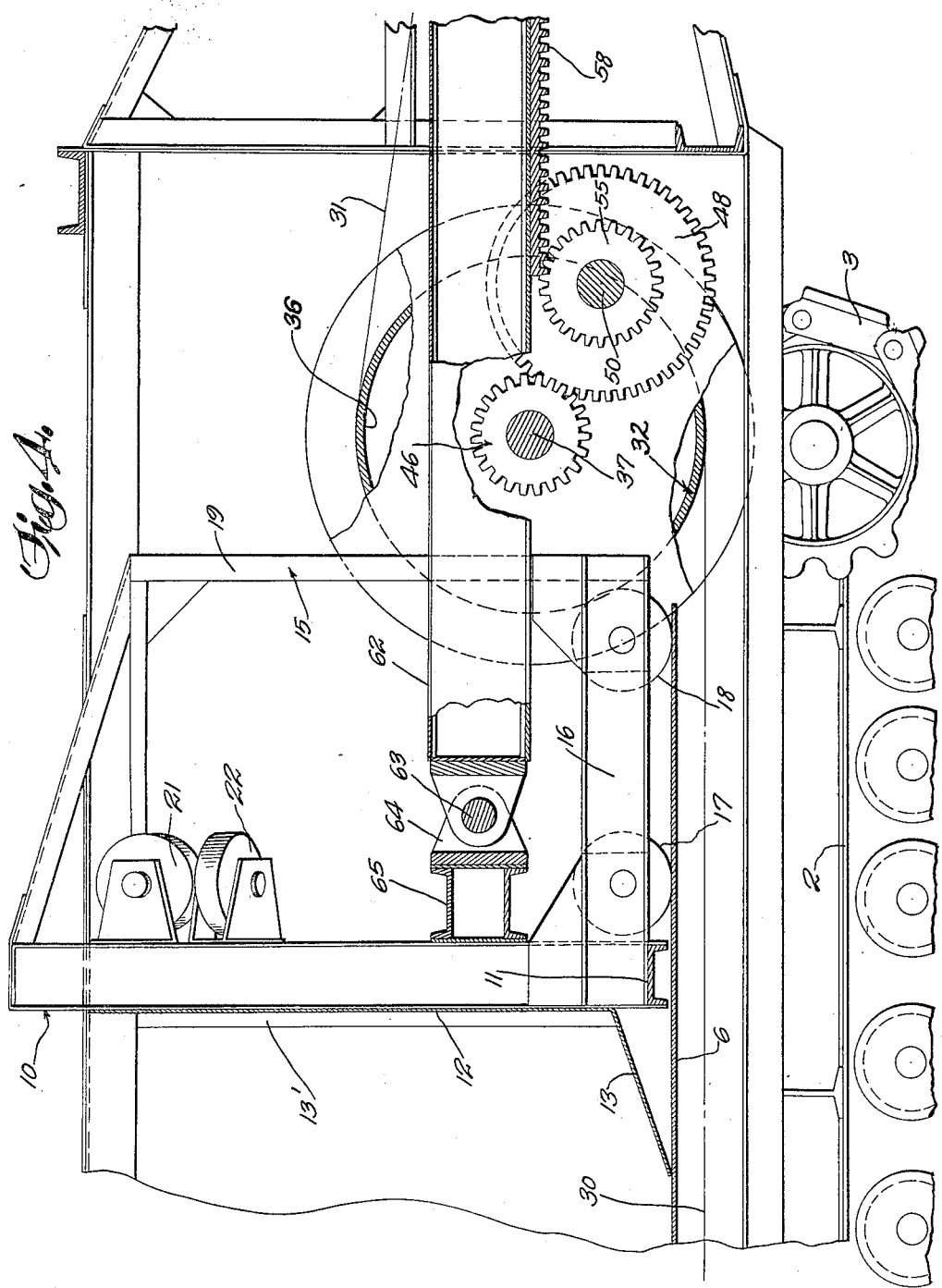
Figure 4 is a fragmentary sectional view taken on line 4—4 of Figure 2, parts being broken away for the sake of illustration.

For a full disclosure of the manner in which a crawler wagon embodying the present invention may be advantageously embodied in an excavating system, reference is made to the pending application of Gwynn L. Lillard for excavating systems, filed October 11, 1929, Serial No. 398,837.

Referring to the drawings, it will be seen that the crawler wagon embodying the present invention comprises generally a body designated generally at 1 which is supported on a truck 2, the truck 2 preferably being of the type having free running flexible belts or self-laying tracks 3.

The body of the wagon is made up of sides 4 and 5 which incline inwardly and downwardly to a bottom 6 and are braced and reinforced by posts 7 and crossed braces 7' (see Figure 1). One end of the wagon body is open and at the other end a sliding gate designated generally at 10 is provided. The sliding gate 10 may be of any suitable construction but preferably consists of a suitably braced channel frame 11 to the front of which a metal plate 12 is suitably secured. The plate 12 is provided with an apron 13 at its lower end and with similar aprons 13' along its side edges, which aprons 13 and 13' travel along the bottom and sides of the wagon body when the gate is moved whereby to insure a complete discharge.

As illustrated to advantage in Figures 2 and 4, the gate 10 is supported on a carriage designated generally at 15 and having frame members 16 securely connected to the lower bar of the channel frame 11 of the gate and carrying front and rear rollers 17 and 18 which ride on the bottom of the wagon body.

The carriage 15 is completed by appropriate framing structure 19 which interconnects its frame members 16 with the top portion of the gate 10. At each side of the upper portion of the framing structure 19 rollers 21 and 22 are rotatably supported as indicated in Figure 3, the rollers 21 engaging beneath guide rails 23 rigidly secured to the upper edge portions of the sides of the wagon while the rollers 22, which are positioned just below the rollers 21 and arranged with their axes at right angles thereto, directly engage the wagon sides 4 and 5. In other words, the gate is mounted on and constrained to proper movement by three sets of rollers, one set of rollers consisting of the rollers 17 and 18 and riding on the bottom 6 of the wagon, another set of rollers comprising the two rollers 21 which engage under the guide rails 21 to prevent upward displacement of the gate, and a third set comprising the rollers 22 which engage the wagon sides to prevent excessive friction between these wagon sides and the traveling gate.

For moving or pulling the wagon from the point at which it is loaded to the point at which it is dumped, and vice versa, haul-in and haul-back lines designated at 30 and 31 (see Figure 4), are provided and may be operated from the power driven drums in the manner disclosed in the Lillard application above referred to. The haul-in line 30 extends beneath the bottom of the wagon and between the wagon bottom and the truck frame and is coiled about and is secured to a drum 32, as indicated diagrammatically in Figure 4. Suitable guide rollers 35, preferably consisting of the conventional arrangement of two vertical and two horizontal rollers (see Figure 1), are provided for the haul-in line at the point where it enters the passage provided therefor between the bottom of the wagon body and the truck frame. The haul-back line 31 is coiled about and secured to a drum 36 and, as illustrated in Figure 4, is reversely wound with respect to the haul-in line 30.

The drums 32 and 36 are constrained to rotate together and may be of one piece construction. As illustrated in the drawings these drums are mounted at the rear of the wagon and are fixed to a drum shaft 37 supported in bearings 38 mounted on an extension of the truck frame. At one end, the drum assembly 32, 36 is provided with a brake drum 40 equipped with conventional brake band 41 which may be moved to braking position or released by any conventional brake operating mechanism (not shown). When the brake band 41 is applied it holds the drums 32 and 36 against rotation and consequently the pull on either the haul-back or haul-in line causes the crawler wagon to move bodily in one direction or the other, that is, the crawler wagon is pulled over the ground.

The free running treads of the crawler wagons may also be provided with suitable or conventional brakes, as for example in accordance with the disclosure of the Lillard application above referred to.

When the brake band 41 is released and the drums 32 and 36 are free to be rotated in one direction or the other depending upon whether the haul-in or haul-back line is operated, the motion of these drums is utilized to slide the gate 10, and the organization between the drums and the gate is such that the operating force is applied with mechanical advantage to the gate. As illustrated in the drawings the drum shaft 37 has relatively small pinions 45 and 46 fixed to the end portions thereof located between the ends of the drums and the bearings 38. These pinions 46 constantly mesh with large gear wheels 47 and 48 fixed on short shafts 49 and 50. The shaft 49 is journaled in a pair of spaced bearings 52 and similarly the shaft 50 is journaled in spaced bearings 53. In between the bearings 52 a pinion 54 is fixed to the shaft 49 and similarly a pinion 55 is fixed to the shaft 50 in between the bearings 53. The pinions 54 and 55 mesh with racks 57 and 58, respectively, these racks having flanges 54' and 55' overlapping the sides of the pinions and being fixed to tubular bar-like structures 61 and 62. The forward ends of bar-like structures 61 and 62 are positively and pivotally connected as at 63 to brackets 64 secured to a reinforcing member 65 extending transversely of and securely connected to the frame of the gate. The bar-like members 61 and 62 slide through guides 67 and 68 which are securely connected to the bearings 52 and 53 or to other stationary parts of the machine and which function to hold the racks properly meshed with their pinions. The sliding bar structures 61 and 62 are further guided and supported by means of guides 71 and 72 secured to and carried by transverse members 73 of a rearward frame extension 74. A suitable arrangement of horizontal and vertical guide rollers 75 (see Figures 1 and 2) for the haul-back line 31 may also be mounted on the transverse members 73. The frame extension 74 may also provide a support for the operator's platform, on which the operator's seat and the control levers for the brakes are located, all as disclosed in detail in the Lillard application referred to. At their rearward ends the racks are provided with downwardly directed stop lugs 70 to limit the forward movement of the racks.

In operation, when the gate 10 is to be moved forwardly to discharge the contents through the open end of the wagon body the brake 41 is released and the haul-in line 30 is pulled or wound upon its power driven drums of its operating unit (not shown) while the haul-back line 31 is paid out. This movement of the haul-in line 30 rotates the drums 32 and 36 in a clockwise direction, as viewed in Figure 4, and causes the pinions 45 and 46 on the drum shaft 37 to rotate and acts through the gears 47, 48 and the pinions 54 and 55 to forcibly propel the tracks forwardly, thereby pushing the gate along the wagon body and discharging the contents out through the open end of the wagon. At this time the conventional brake usually employed for the flexible treads may be applied so as to prevent movement of the crawler wagon. The gate 10 is returned to its normal position by paying out on the haul-in line 30 and winding up the haul-back line 31 on its power driven drums. Such operation reversely rotates the drums 32, 36 and consequently slides the rack bars rearwardly to pull the gate 10 back to the position shown in the drawings.

The invention claimed is:

1. A crawler wagon having a body and free running flexible endless treads supporting said body, said body having one end open, a gate for the other end of the body slidable longitudinally thereof and operable to close one end of the wagon and to travel longitudinally along the body to discharge the contents of the wagon through the open end of the latter, a pair of drums rotatably supported on the body, haul-back and haul-in lines connected to said drums, reduction gearing connected to and rotated by the drums when the latter are rotated and rack and pinion mechanism between the gearing and the slidable gate.

2. A crawler wagon having a body and free running flexible endless treads supporting said body, said body having one end open, a gate for the other end of the body slidable longitudinally thereof and operable to close one end of the wagon and to move along the body to discharge the contents of the wagon through said open end, a pair of drums rotatably supported on the body, haul-back and haul-in lines connected to said drums, reduction gearing connected to and rotated by the drums when the latter are rotated, rack and pinion mechanism between the gearing and the slidable gate, and a brake for said drums.

3. A crawler wagon of the character described including a truck, a body mounted on said truck and having one end open, a slidable gate for closing the other end of the body and adapted to traverse the body to discharge the contents of the wagon through the open end thereof, a pair of drums constrained to rotate together and rotatably supported on said truck, haul-back and haul-in lines connected to said drums, a brake for said drums, whereby when the brake is set the lines may be utilized to move the wagon body, spaced rack bars connected at one end to the gate, pinions meshed with the rack bars and motion transmission means between the drums and the pinions whereby the rotation of the drums is operable to reciprocate the racks and thus slide the gate longitudinally of the wagon body.

4. A crawler wagon having a body and free running flexible endless treads, said body having one end open, a gate for the other end of said body and supported for sliding movement longitudinally of the body, whereby the gate is operable to close one end of the body and is also effective when moved along the body to discharge the contents thereof through said open end, operating lines for pulling said wagon back and forth, a drum assembly supported on said wagon and to which said lines are connected, a brake for said drum assembly, reduction gear actuated by said drum assembly when the latter is rotated by said lines, and a longitudinally shiftable operating element connected to said gates and actuated by said reduction gearing.

5. A mobile carrier having a movable gate operable to discharge the contents of the carrier, a drum assembly supported for rotation on said carrier, releasable holding means for securing said drum assembly against rotation, operating lines directly connected to said drum assembly and operable to pull the carrier bodily in either direction or to reversely rotate the drum assembly depending upon the setting of the holding means and the manner in which said lines are operated, and reduction gearing providing a positive motion transmission train between said drum assembly and said gate for positively moving said gate in either direction depending upon the direction of rotation of the drums.

6. A mobile carrier having a movable gate operable to discharge the contents of the carrier, a drum assembly supported for rotation on said carrier, releasable holding means for securing said drum assembly against rotation, operating lines directly connected to said drum assembly and operable to pull the carrier bodily in either direction or to reversely rotate the drum assembly depending upon the setting of the holding means and the manner in which said lines are operated, a pair of bars positively connected to said gate and having rack teeth, pinions meshed with said rack teeth and reduction gearing between said drum assembly and said pinions.

7. A mobile carrier having a movable gate operable to discharge the contents of the carrier, a drum assembly supported for rotation on said carrier, releasable holding means for securing said drum assembly against rotation, operating lines directly connected to said drum assembly and operable to pull the carrier bodily in either direction or to reversely rotate the drum assembly depending upon the setting of the holding means and the manner in which said lines are operated, a pair of spaced rack bars positively and pivotally connected at their forward ends to said gate, guide supporting said bars for sliding movement, pinions meshed with said rack bars, and a set of reduction gears between each pinion and said drum assembly.

8. A mobile carrier having a movable gate operable to discharge the contents of the carrier, a drum assembly supported for rotation on said carrier, releasable holding means for securing said drum assembly against rotation, operating lines directly connected to said drum assembly and operable to pull the carrier bodily in either direction or to reversely rotate the drum assembly depending upon the setting of the holding means and the manner in which said lines are operated, and reversible positively acting motion transmission mechanism interposed between and positively interconnecting the drum assembly and the gate for positively moving said gate in either direction depending upon the direction of movement of the drum assembly.

9. A mobile carrier of the character described including a truck, a body mounted on the truck and having a bottom and inclined sides, one end of the body being open, a gate for closing the other end of the body and slidably longitudinally thereof for discharging the contents of the wagon body through the open end thereof, a carriage supporting said gate and having rollers riding on the bottom of the wagon, guide rails projecting inwardly from the upper portions of the sides of the wagon body, a plurality of sets of rollers cooperable with the sides of the body and with said guide rail respectively, and means for shifting the gate along the wagon.

10. A mobile carrier of the character described including a truck, a body mounted on the truck and having a bottom and inclined sides, one end of the body being open, a gate for closing the other end of the body and slidably longitudinally thereof for discharging the contents of the wagon body through the open end thereof, a carriage supporting said gate and having rollers riding on the bottom of the wagon, guide rails projecting inwardly from the upper portions of the sides of the wagon body, a plurality of sets of rollers cooperable with the sides of the body and with said guide rail respectively, and means for shifting the gate along the wagon and comprising power operated drums, and reduction gearing between the drums and the gate.

11. A mobile carrier having a movable gate operable to discharge the contents of the carrier, a drum assembly supported for rotation on said carrier, releasable holding means for securing said drum assembly against rotation, actuating means connected to the drum assembly and operable to pull the carrier in either direction or to reversely rotate the drum assembly depending upon the setting of the holding means and the manner in which the actuating means is operated, and motion transmission means between the drum assembly and said gate.

In witness whereof, I hereto affix my signature.

ERNEST R. STANDFUSS.